INVENTORS
Harold A. McMaster;
BY & Norman C. Nitschke
Barnard, McGlynn & Reising
ATTORNEYS

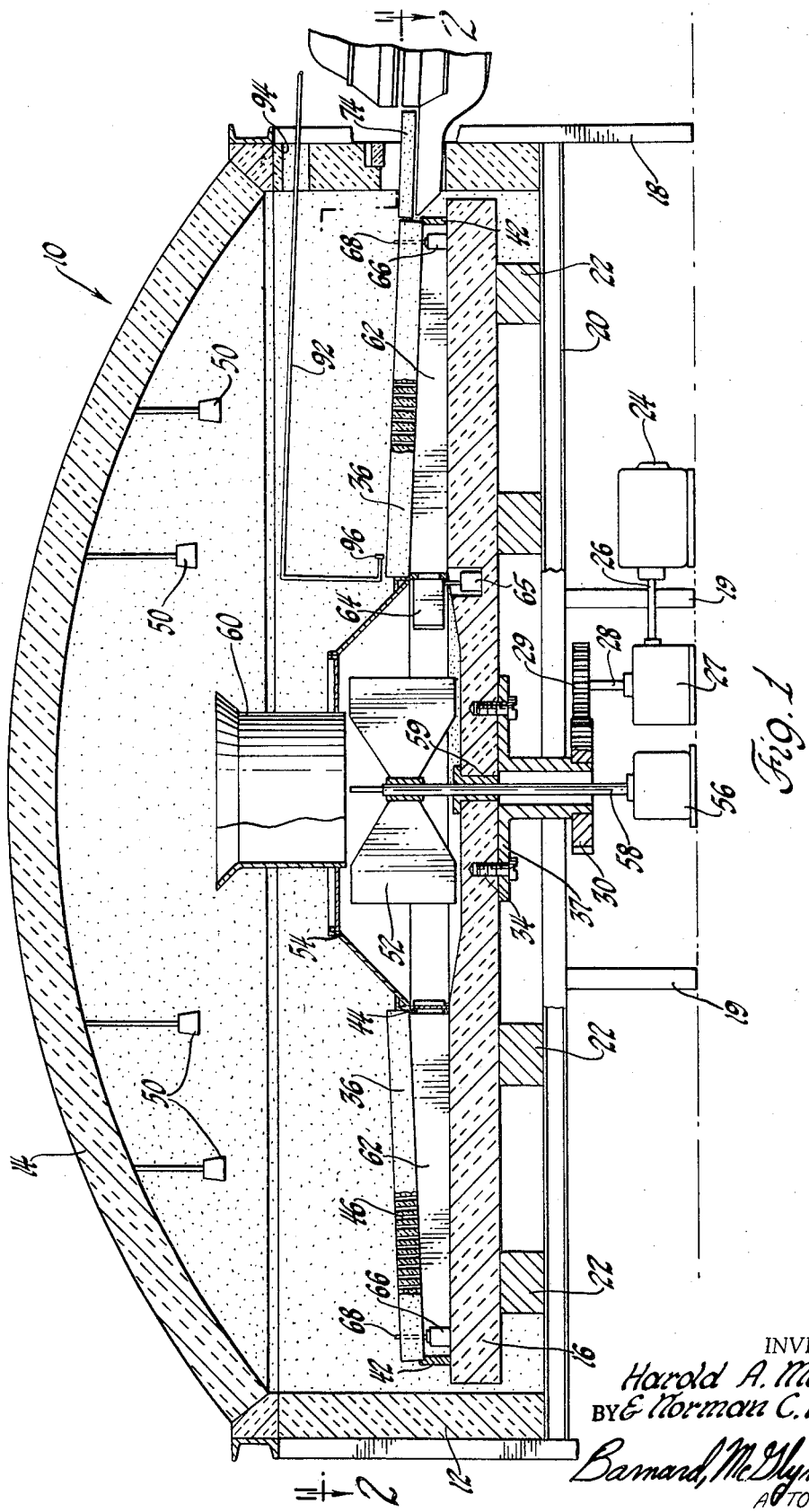

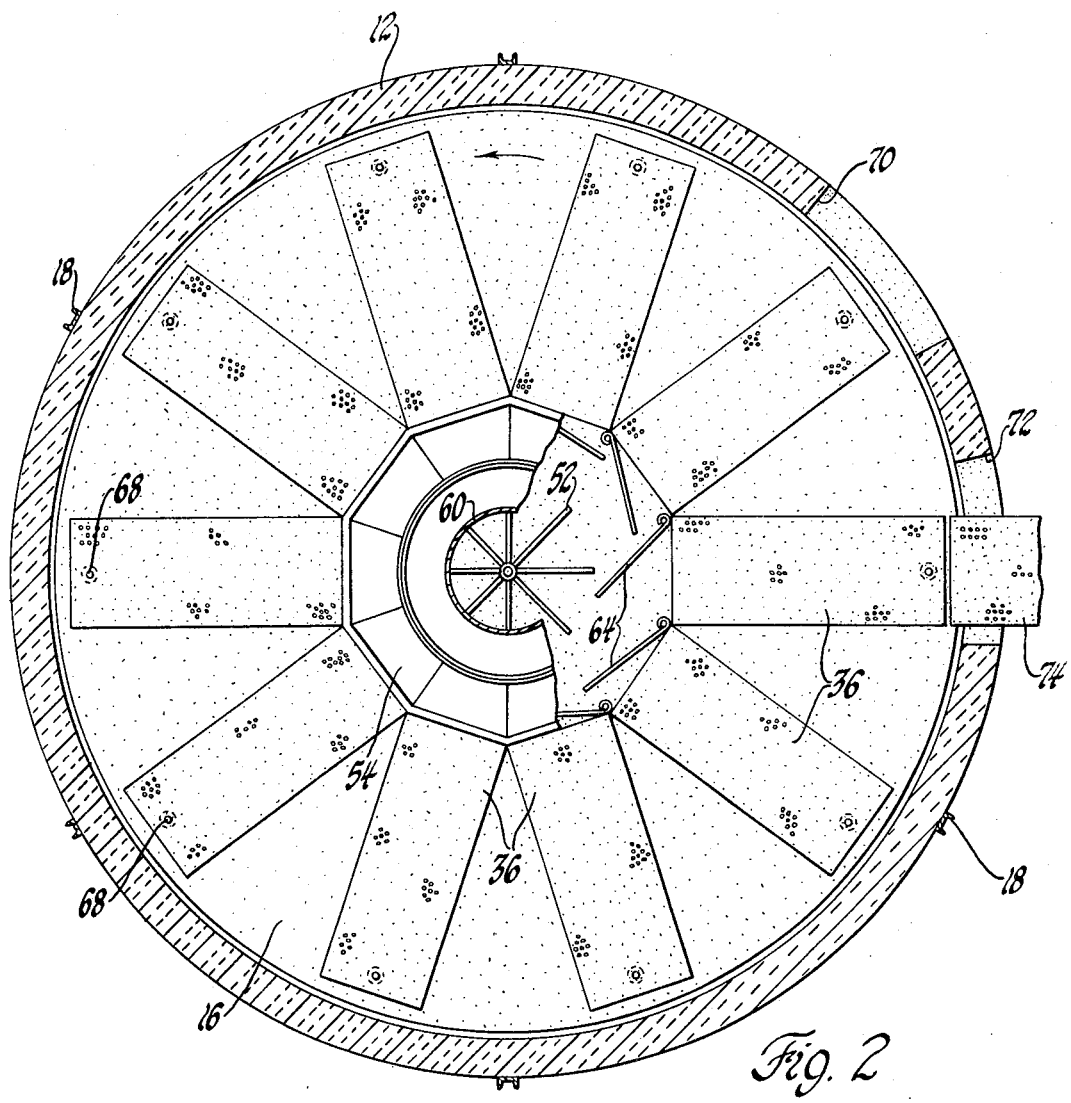

United States Patent Office 3,510,284
Patented May 5, 1970

3,510,284
METHOD AND APPARATUS FOR RESHAPING GLASS SHEETS ON A BENDING MOLD
Harold A. McMaster, Woodville, and Norman C. Nitschke, Perrysburg, Ohio, assignors to Permaglass Inc., Woodville, Ohio, a corporation of Ohio
Filed May 24, 1965, Ser. No. 458,277
Int. Cl. C03b 23/02
U.S. Cl. 65—25                                    19 Claims

ABSTRACT OF THE DISCLOSURE

A glass treating furnace having a circular housing with a floor rotatably supported within the housing. A plurality of molds each having a concave upper surface disposed in a circle on the floor with each mold slanting downwardly in a radially outwardly direction. Gases are supplied to the concave surfaces of the molds as sheets of glass disposed thereover are heated and sag under the force of gravity into the mold. The apparatus may be operated to support a major portion but not all of the weight of a sheet on gases after it has conformed to the curvature of the concave surface with the flow of gases being sufficiently increased thereafter to support the sheet at a higher distance above the mold surface. Alternatively, the apparatus may be operated so as to supply gases over the concave surface as the sheet approaches the surface to increase the velocity of the flow of gases over the mold surface with the gas flow being thereafter increased sufficiently to support the sheet at an increased distance over the mold surface. As another alternative, the apparatus may include a sensing means over the central portion of the mold surface so that as the glass sags and contacts the sensing means gases are supplied to support and raise the sheet to an increased distance above the concave surface.

---

This invention relates to a method and apparatus for treating sheet material and, more particularly, to a method and apparatus for manufacturing sheets of glass such as are used for automobile windows and the like. The invention has particular utility for forming curved tempered glass sheets and hence will be described in detail with reference to such embodiment.

In recent years there has been a greatly increased demand for curved glass sheets or plates for use as automobile windows, protective windows, for television screens, architectural glass, etc. Also, there has been ever increasing recognition of the advantages of tempered glass, particularly its high strength and safety features. Currently, the big demand is for windows of relatively thin tempered curved glass. To manufacture tempered glass, it is necessary that the individual glass pieces first be cut and formed to the particular shape desired and then tempered. Hence, to manufacture curved tempered glass automobile windows, or the like, the essential sequence of steps is (1) form an untempered glass sheet to proper size, with edges rounded and polished as desired, (2) heat and bend the sheet to the curvature required, and (3) rapidly and uniformly cool the curved sheet to provide the temper.

The stock method for bending a sheet of glass to the proper curved configuration is to heat the glass sheet to its softening temperature and then press the sheet between two mold surfaces of the desired curvature, or to allow the sheet to sag under gravity against a mold having a concave surface.

The press bending method of making curved glass sheets involves supporting the glass on tongs or racks, usually in the vertical position, and heating the glass sheet in a furnace, or the like to the softening point. The glass sheet is then pressed between contoured matched dies. The dies are usually covered with an insulating material. There are many problems encountered in this process. One of the problems is that during the heating and softening of the glass, the glass is marred or distorted by its contact with the rack or tongs by which it is supported or carried. Sequentially, the sheet of glass is heated in a furnace and then taken out of the furnace and placed between the two press molds and then moved into a medium of air, such as into a blasthead, for tampering. In order for the sheet of glass to be at a sufficiently high temperature for tempering when it is removed from the press molds, the sheet of glass must be at a very high temperature when taken from the furnace and placed between the molds. When the sheet of glass is maintained at a temperature as it is being bent in the press molds sufficiently high for adequate tempering, it is soft and very susceptible to marring by contact with the mold or the insulating material covering the mold. This problem is in part solved by utilizing a disposable sheet of glass between the molds on each side of the sheet of glass to be bent to prevent marring of the sheet of glass being bent, but this is expensive due to the waste of glass. On the other hand, if the sheet of glass to be bent is not at a sufficiently high temperature when it is placed between the press molds, it will not take the proper bend and will not receive a full temper when it is removed from the molds and placed in a medium for tempering.

The other method of curving a sheet of glass, wherein the sheet is heated and allowed to sag under the force of gravity against a mold having a concave surface, has not proved satisfactory due to the injurious contact of the glass with the mold, which causes marring of the glass. Furthermore, if a sheet of glass is removed from the concave molds, which is of the type heretofore utilized, before it has sagged sufficiently to contact the center portion of the mold, the glass has not reached a temperature sufficient for an adequate temper and the degree of curvature is not always the same among different curved sheets of glass.

A solution proposed by the prior art for the marring problem is to provide a cushion of gas between the softened sheet of glass and the mold. Numerous patents show this concept or variations thereof, U.S. Pat. 2,395,727 to Devol, being typical. These heretofore known methods have not proved satisfactory, however, since each sheet must still be removed from the press dies or mold by tongs or other means engaging the edge of the sheet. The engagement of the edge of the sheet by tongs, or the like, mars or otherwise injures the sheet since the glass sheet is in the softened condition. In other words, there is no known satisfactory method for removing a curved sheet from a mold which has been heated to a temperature sufficient for tempering without contacting the glass sheet in a manner so as to cause injury to the sheet of glass.

Furthermore, there is no known mold upon which a sheet of glass may be placed and heated and allowed to sag under the force of gravity to conform to the shape of the mold without coming into injurous contact with the mold while being heated to a temperature sufficient for tempering. When a sheet of glass is placed upon a convex mold so that the center of the sheet of glass is in contact with the center of the mold, and gas is supplied through the mold to the underside of the sheet of glass, the middle of the sheet of glass will not be prevented from coming into injurious contact with the mold. This result occurs since the gases being supplied between the mold and the sheet of glass will take the path of least resistance and will flow in the space between the mold and the sheet of glass at either side of the sheet of glass rather than flow between the glass and the mold (so as to lift the center of the sheet of glass off the mold) at the point in the middle of the glass where it contacts the mold. Furthermore, there is no known concave mold upon which a sheet of glass may be placed and heated so as to sag under the force of gravity to conform to the shape of the mold and is prevented from coming into injurious contact with the surface of the mold.

Therefore, this invention relates to a method and apparatus whereby a sheet of glass may be suspended across a concave surface and heated to soften and sag to conform to the concave surface while gases are supplied between the glass and the concave surface to prevent the glass from coming into injurious contact with the concave surface. The concave surface is disposed so that the sheet of glass is floated so as to have a component of force, due to the weight of the sheet, to urge the sheet to float toward and over one extremity of the concave surface. Hence, when the sheet of glass has reached a temperature sufficient for tempering, it is floated high enough above the concave surface so that due to the force of gravity it may float toward and over one extremity of the surface and into a medium for tempering.

Accordingly, it is an object and general feature of the present invention to provide an apparatus for suspending a sheet of glass across a concave surface to heat the sheet sufficiently so that it will soften and sag under the force of gravity to conform to the concave surface, and for supplying gases between the sheet of glass and the concave surface in a sufficient quantity to prevent the sheet from injuriously contacting the concave surface and to float the sheet of glass at a distance above the concave surface so that the sheet may be floated away from the concave surface.

It is another object and general feature of the present invention to provide an apparatus and method for suspending a sheet of glass across a concave surface to heat the sheet of glass sufficiently so that the sheet will soften and sag under the force of gravity to conform to the concave surface, and for supplying gases between the concave surface and the sheet of glass to prevent the sheet from injuriously contacting the concave surface while the sheet is being heated to a temperature sufficient for tempering, and capable of supplying gases between the concave surface and the sheet of glass to raise the sheet of glass to a sufficient distance above the concave surface to allow the sheet to be moved away from the concave surface.

Yet another object and general feature of the present invention is to provide an apparatus and method for suspending a sheet of glass across a concave surface to heat the sheet of glass sufficiently for the sheet to soften and sag to conform with the concave surface, and for supplying gases between the concave surface and the sheet of glass to prevent the sheet from injuriously contacting the concave surface while the sheet is being heated to a temperature sufficient for tempering, and having the concave surface disposed in such a manner that the sheet of glass will be floated above the concave surface in such a disposition that a component of force due to the weight of the sheet of glass will urge the sheet to float toward and over one extremity of the concave surface so that the sheet may be floated from the concave surface into a medium of gases for tempering.

Other objects, features, and attendant advantages of this invention will be readily appreciated as the same becomes better understood by reference to the following detailed description when considered in connection with the accompanying drawings wherein:

FIG. 1 is a cross-sectional view of a preferred embodiment of the present invention;

FIG. 2 is a cross-sectional view taken along line 2—2 of FIG. 1;

FIG. 3 is an isometric view of a compoundedly curved mold which may be utilized in the instant invention;

Figure 4:
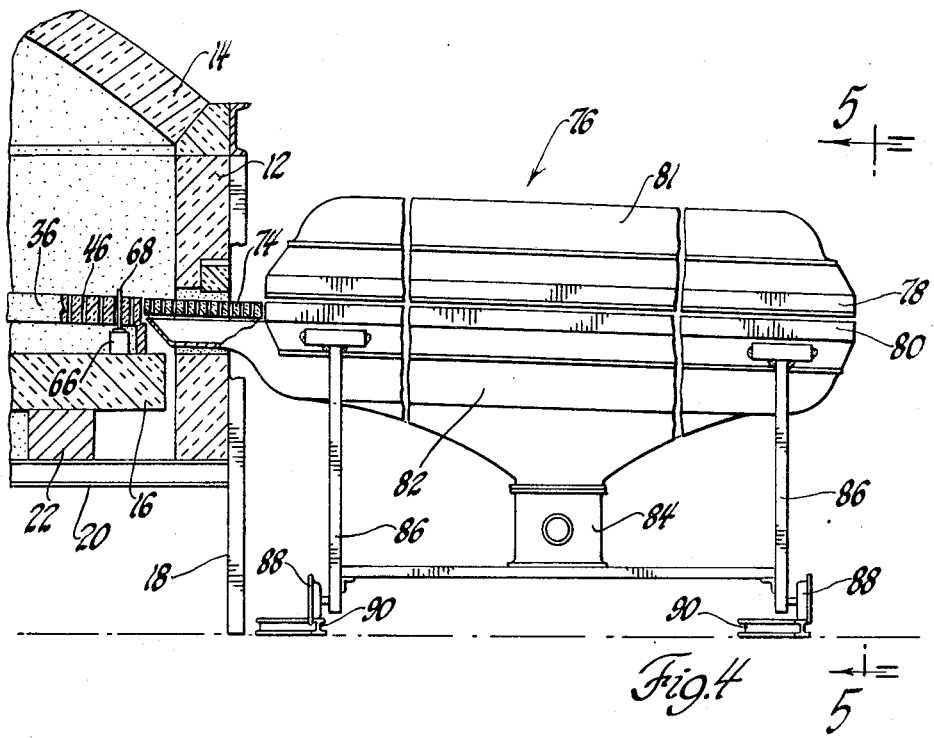
FIG. 4 is an elevational view of a blasthead shown in operative engagement with the embodiment of the invention shown in FIG. 1.
Figure 5:
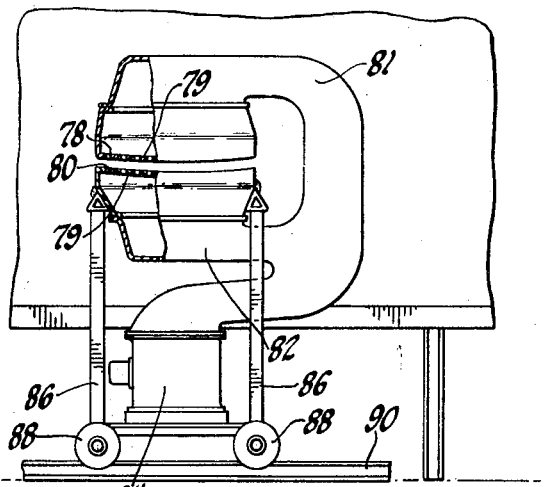
FIG. 5 is a view taken along line 5—5 of FIG. 4.

Referring now to the drawings, wherein like numerals indicate like or corresponding parts throughout the several views, there is shown generally at 10 an apparatus for treating sheets of material. It should be understood that the invention can be used for various other treatments of sheet material; however, it will be described in detail with reference to the treating of sheets of glass.

The apparatus for treating a sheet of glass comprises a housing 12 including a spherical-shaped dome 14 and a circular floor 16. The housing 12 including the dome 14 and the floor 16 is made of insulating material. The housing 12 is supported on a structure comprising the legs 18 and 19 and the beams 20.

The circular bearing members 22 are supported on the cross beams 20. The floor 16 is mounted in the housing for rotation about the center thereof and slidably rides upon the bearing members 22. A drive means is operatively connected to the floor 16 for rotating the floor and includes a motor 24 having an output shaft 26 connected to the reduction gear box 27. The reduction gear box 27 is connected through to a shaft 28, to the gears 29 and 30. The gear 30 is splined or fixed in any other appropriate manner to the flange member 32. The flange member 32 is secured to the floor 16 by any appropriate means such as by the bolts 34.

A plurality of molds 36 are disposed on the floor 16 radially about the center of the furnace, as is more clearly shown in FIG. 2. Each of the molds has a concave upper surface which is either compoundedly curved, as is shown by the mold 38 of FIG. 3, or cylindrically curved, as is shown by mold 40 of FIG. 6.

Also included is a means for supporting each mold above the floor 16 so that the mold slants downwardly in a direction radially away from the center of the floor. The means for supporting each mold includes a support leg 42 at the radially outward end of each mold and a support structure 44 at the radially inward end of each mold.

There is included means for supplying gases above the concave surface of each of the molds so that a sheet of glass may be suspended across the mold and heated so as to soften and sag to confrom to the concave surface of the mold while the gases prevent the sheet of glass from coming into injurious contact with the concave surface. This means includes passages through the molds and means disposed at the center of the floor in the housing for determining the quantity of gases to be moved through the passages in each respective mold. Each of the molds utilized in the present invention has inlet passages 46, as shown in molds 36, 38, and 40 respectively. In addition, in some embodiments of the invention, a mold may be utilized which also has outlet passages 48, such as those indicated in mold 40 of FIGS. 6 and 7. The significance of the inlet passages and the outlet passages will be more fully explained hereinafter.

The means for determining the flow of gases through the passages of each respective mold includes a blower to move the gases from within the housing through the passages 46, and control means for directing a quantity of gases through the passages 46 of each respective mold. The blower means includes a fan 52, a housing 54, and a motor 56 to drive the fan 52. The motor 56 is connected through a shaft 58 to the fan 52. A bushing or sleeve 59 is inserted in the floor 16 as a bearing support for the shaft 58. A housing 54 surrounds the fan 52 and has a flange inlet 60 for guiding air from within the furnace to the fan 52. The control means includes the partitions 62 along each side of each mold 36, and a gas flow means taking the form of doors 64 disposed on the support f.ame structure 44 adjacent the radially inward end of each respective mold 36. The legs 42 extend entirely across the radially outward end of each respective mold 36 so that the partitions 62 and the leg 42 form an individual plenum chamber beneath each respective mold 36. The doors 64, then, determine the amount of gas flow from the fan 52 to each respective plenum chamber which in turn determines the pressure and quantity of gases which pass through the inlet passages 46. The position of each respective door 64 may be controlled by any appropriate means such as by an electric motor 65 disposed in the floor 16.

In order to provide heat within the furnace, a plurality of burners 50 are provided, in varying numbers and varying distances from the center of the furnace. The burners 50 produce heat which may be radiated from the dome 14. The burners 50 may be of any suitable type sufficient to provide the proper amount of heat and be operated on a convenient fuel such as a gas and air mixture. The burners receive the fuel and air mixture through a conventional piping system, not shown. Radiant burners which burn at temperatures of about 2000° F. and which are well known in the glass processing furnace art are preferred.

A stop means is disposed adjacent the radially outward end of each mold 36 to selectively prevent a sheet of glass which is floating on a blanket of gases above a respective mold from floating radially outward from the center of the floor 16. The stop means may take any appropriate form but is illustrated as a solenoid 66 having a plunger 68 which extends through the mold 36. The solenoid 66 may be operated to retract the plunger 68 from above the concave surface of the mold 36.

The circular housing 12 has an aperture or hole 70 therein for allowing a sheet of glass to be moved into the housing and onto the concave surface of one of the molds 36. The housing also has a second aperture or hole 72 to allow a sheet of glass to be removed from the housing 12.

A means is provided for removing a sheet of glass through the aperture 72 which in cludes a ramp 74 projecting through the aperture 72 and terminating adjacent the cricular path of the radially outward ends of the molds 36. The ramp 74 has a surface which slants downwardly in a direction radially away from the center of the floor 16 in the same manner as the molds 36. The ramp 74 has an upper surface which is curved transverse the direction which the ramp slants downwardly so as to form a trough along which a sheet of glass may be floated, although the ramp may have a flat surface.

The blasthead, generally shown at 76, is disposed at the radially outward end of the ramp 74 for receiving and tempering a sheet of glass. The blasthead includes an upper bed 78 and a lower bed 80. The beds 78 and 80 are generally arcuate in form, the upper bed 78 being convex and the lower bed 80 being concave to receive the curved glass sheets therebetween. If the furnace produces compoundly curved glass sheets, that is, sheets which are curved about axes which are perpendicular to one another, the upper and lower beds 78 and 80 respectively will be disposed at a sufficient distance apart so as to accommodate a floating sheet of glass therebetween. Each of the beds 78 and 80 are provided with perforations or air passages 79, and each is provided with ductwork 81 and 82 which lead from a suitable air blower apparatus 84. The air blower apparatus 84 may be any known type of construction suitable to provide a blast or room temperature air to the upper and lower beds 78 and 80 in accordance with normal tempering techniques. The air duct 82 extends into the hole 72 beneath the ramp 74 so that air is moved through the passages in the ramp 74 to provide a blanket of gases above the surface of the ramp 74 for floating a sheet of glass along the ramp. Consequently, the ramp 74 is attached to and is immovable realtive to the blasthead 76.

The ramp 74 and the blasthead 76 are supported on the legs 86 which are in turn attached to the wheels 88. The wheels 88 roll along the circular curved rails 90. The rails 90 are concentric with the center of rotation of the floor 16. The blasthead 76 and the ramp 74 are movable in a circular path with the floor 16 so that a sheet of glass may be moved from a mold 36 as the floor 16 is rotating. That is to say, that, as viewed in FIG. 2, the ramp 74 is radially aligned with a mold 36 as the mold clears the side of the aperture 72 so that the ramp 74 moves with the particular mold 36 in a circular path a distance sufficient for a sheet of glass to float from the mold 36 over the ramp 74.

OPERATION

The floor 16 continually rotates in a counterclockwise direction although it is possible to arrange the drive mechanism so that the floor is indexed so that it continually moves a short distance and stops, and moves a short distance and stops, etc. It is preferable that the floor continually rotate due to the high inertia of the floor and the molds which makes it difficult to stop and start the rotation of the floor 16.

A sheet of cold glass is inserted through the aperture 70 of the housing 12 and suspended across the concave surface of one of the molds 36. Tongs may be used to place the sheet on a mold 36 since the sheet is relatively cold and not subject to marring by contact with the tongs or other appropriate handling devices.

As the floor 16 rotates to move each of the respective molds 36 in a circular path, a sheet of glass suspended across one of the molds 36 is heated as the floor 16 moves in a counterclockwise direction. As the sheet of glass moves in a counterclockwise direction, it is heated so that it softens and sags under the force of gravity to conform to the concave surface of the mold 36 upon which it is supported. The blower 52 pulls hot gases from the upper part of the furnace where the gases have been heated by the burners 50. The gases are routed by the blower 52 to the respective plenum chambers underneath each of the molds 36 from whence they are forced by pressure from the blower up through the passages 46 in each of the molds 36. After passing through the passages 46 in the mold, the gases circulate to the upper part of the furnace for recirculation as described.

The gases are supplied above the concave surface of each mold so that as the sheet of glass sags to conform to the concave surface of the mold, the gases prevent the sheet from coming into injurious contact with the concave surface. That is to say, if the sheets of glass on each of the respective molds 36 are allowed to be totally supported by the concave surface of each respective mold 36 while they are in the softened condition, they will be marred by contact with the mold. To prevent this marring contact with the mold 36, each sheet is prevented from coming into such contact with a respective mold that would cause marring of the sheet. This may be accomplished by one of several methods.

The first method in which a sheet of glass may be prevented from coming into injurious contact with the concave surface of each respective mold 36 is to position the door 64 associated with each respective mold 36 so as to regulate the amount and pressure of gas flow through the passages 46 in that respective mold as the mold is moved during a first portion of a revolution of the floor 16. The quantity and pressure of gases allowed to pass through the passages 46 is regulated so that less than the entire weight per unit area of a sheet of glass is supported by the gases above the mold. Preferably, the doors 64 are positioned so that a quantity of gases at the desired pressure passes through the passages 46 of each respective mold during the first portion of a revolution of the floor 16 so that approximately 95 percent of the weight per unit area of the sheet of glass above each respective mold 36 is supported by the gases. However, it will be evident to those skilled in the art that the percent of the weight of a sheet of glass which is supported by the mold will vary according to the size of the glass sheets to be produced, the marring tolerances, etc. The sheet of glass on each respective mold, therefore, does in fact contact the concave surface of the mold; however, such contact accounts for approximately only five percent of the weight per unit area of the sheet of glass. The support of five percent of the weight of a sheet of glass by the concave surface of each respective mold is not sufficient to cause injurious marring to the sheet of glass. After the sheet of glass has sagged to conform to the concave surface of the mold so that 95 percent of the weight of the sheet of glass is being supported by gases above the concave surface, the gases will be in a substantially static condition. That is to say, the flow of gases escaping from the edges of the sheet of glass is negligible so that the gases remain between the sheet of glass and the concave surface. When the glass sheet is in condition, it may remain in the mold as the floor 16 rotates a sufficient time to be heated to the temperature necessary for tempering.

As each respective mold 36 moves through a second or last portion of a revolution of the floor 16, it approaches the aperture 72. As a mold 36 completes a revolution and approaches the aperture 72, the means for moving the air, including the blower and the door 64, goes into a second mode of operation. In the second mode of operation, the door 64, associated with the respective mold 36, is moved to a more open position to increase the pressure of the gases above the concave surface associated with that respective mold. The pressure of the gases above the mold 36 as it approaches the aperture 72 is sufficient to support the entire weight of the sheet of glass above the concave surface of that mold 36. As pointed out hereinbefore, each concave mold is disposed in the apparatus so that a sheet of glass may be floated on gases so as to have a component of force due to the weight of the sheet to urge the sheet to float toward and over one extremity of the mold. That is to say, each mold is supported on the floor 16 at an angle to the horizontal so that it slants downwardly in a radially outward direction so that the radially outward extremity is lower than the radially inward extremity. During the second mode of operation, wherein the door 64 is open to allow an increased quantity of gases to move through the passages 46 to increase the pressure of the gases above the mold surface, the sheet of glass is raised a distance above the concave surface so that it may move in a radially outward direction over the radially outward extremity of the mold. That is to say, a sheet of glass is in a curved configuration and the sheet must be raised on the floating gases a sufficient distance above the mold so that the center of the sheet of glass will not contact any portion of the mold. This distance is very significant especially when the mold 36 is compoundedly curved, such as the mold 38 shown in FIG. 3.

The plunger 68 of the solenoid 66 associated with each mold 36 protrudes above the concave surface to engage the radially outward end of the sheet of glass to prevent the sheet of glass from floating radially outwardly under the force of gravity until the sheet of glass is fully supported at a sufficient distance above the bed to move in a radially outward direction over the radially outward extremity of the particular mold 36.

When each respective mold 36 is aligned with the ramp, the ramp 74 and the blasthead 76 move in a circular path across the aperture 72 with the mold 36. The solenoid 66 is operated to move the plunger 68 below the concave surface so that a sheet of glass then floats under the force of gravity over the radially outward extremity of the mold 36 and is floated over the ramp 74 and into the blasthead 76. The sheet of glass is floated on the ramp 74 before the ramp 74 has traversed the entire width of the aperture 72. Once the sheet of glass is floating on the ramp 74 and/or in the blasthead 76, the ramp 74 and blasthead 76 stop movement in a circular path and move in a clockwise direction back to the opposite side of the aperture 72 to be in position for alignment with the next approahcing mold 36.

Figure 7:
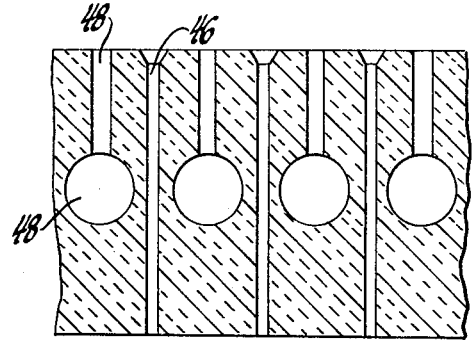
FIG. 7 is an enlarged cross-sectional view taken along line 7—7 of FIG. 6.
Figure 6:
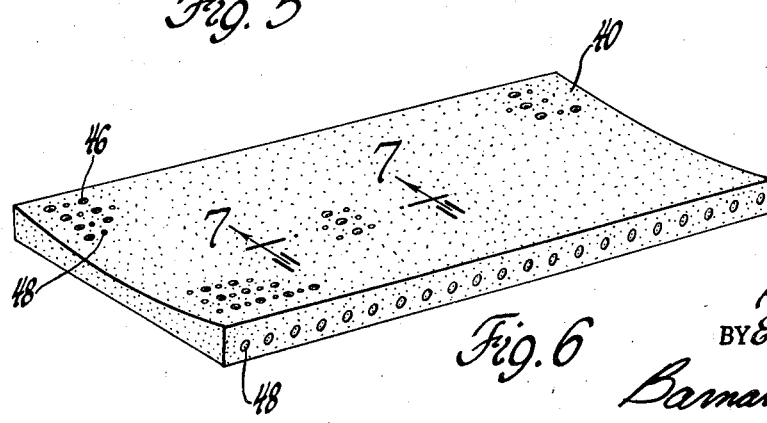
FIG. 6 is an isometric view of a cylindrically curved mold which may be utilized in the instant invention.

In the process and apparatus as described above, the glass sheet is supported by gas sufficiently to prevent injurious contact thereof with the mold or bed surface by way of there being sufficient gas pressure and flow to support at least a portion of the weight of the glass sheet. The second method whereby the glass sheet can be maintained out of injurious contact with the bed or mold while it is heated to deformation temperature, or otherwise treated, is by utilization of the Bernoulli principle. In accordance with the Bernoulli principle, when a fluid flows through an orifice or opening, the velocity of the gases flowing over the bed or mold duction in static pressure of the fluid. As applied here, the velocity of the gases flowing over the bed or mold can be sufficient to create the Bernoulli effect between the surface of the bed or mold and the sheet. Hence, by reason of the reduced static pressure between the sheet and the bed, the sheet will move and be maintained in an equilibrium closely spaced relationship to the bed surface, the precise equilibrium position being a function of the weight of the sheet and the flow of the gases. It should be noted that by utilizing this Bernoulli principle to support the sheet in closely spaced relationship to the bed, it is not essential that the glass sheet be positioned on top of or over the bed; instead, it is possible to position and maintain a glass sheet in spaced relationship underneath the bed surface by having sufficient gas flow to create a reduction in static pressure thereof sufficient that the difference between atmospheric pressure and the reduced static pressure of the gas flow balances or overbalances the weight of the sheet or, in other words, the force of gravity thereon. In accordance with the Bernoulli principle relied upon, therefore, gases flowing from an inlet to an outlet will increase in velocity when the passage through which the gases are passing is restricted so that its cross-sectional area is reduced. Accordingly, gases flowing between two surfaces will increase in velocity if the two surfaces are moved closer together. Also, the two sheets will be held at a predetermined distance apart by such a flow of gases. Therefore, in order to prevent a sheet of glass from injuriously contacting the concave surface of a respective mold 36 by utilizing the Bernoulli principle, the respective molds 36 preferably have both inlet and outlet passages, as shown in FIGS. 6 and 7. The inlet passages are indicated at 46 and outlet passages being indicated at 48. During the first portion of a revolution of the floor 16, the glass sheet on the respective mold 36 is heated to soften and sag to conform to the concave surface. As the sheet softens and sags, the distance between the sheet and the concave surface decreases so that the velocity of the flow of gases across the surface from the inlet passages 46 to the outlet passages 48 is increased to reduce the static pressure of the gas flow so as to hold the sheet of glass at a predetermined distance above the concave surface. In actual practice, it has been found that the sheet of glass will be supported on a thickness of about .005 to .020 inch of gas film. When the glass sheet has been heated sufficiently for temper, the mold upon which it rests is approaching the outlet aperture 72 and the quantity of gas flow to the inlet passages 46 is increased to float the sheet of glass at a higher distance above the surface of the mold. Alternatively, means (not shown) are provided to plug the outlet passage 48 so that there will be an increased back pressure of gases above the concave surface to float the sheet of glass at a higher distance above the concave surface. For example, the sheet may be floated about an eighth of an inch above the mold surface and in contact with the plunger 68 of the solenoid 66 until the mold is aligned with the ramp 74, at which time the solenoid 66 is actuated to disengage the plunger 68 from the edge of the glass sheet so that the glass sheet will be floated under the force of gravity over the ramp 74 and into the blasthead 76.

An alternative method of utilizing the Bernoulli principle is to close the door 64 during the first portion of a revolution of the floor 16 since there need be no gases above the concave surface when the sheet is being heated and is not yet fully sagged to conform to the concave surface. During a latter portion of the revolution on the floor 16, when the sheet is approaching the concave surface, the door 64 for the respective mold may be open to allow a sufficient quantity of gases to pass through the inlet passages so that the Bernoulli principle may be utilized to support a sheet of glass above the concave surface. The means for supplying gases, therefore, has two modes of operation, a first mode of operation for supplying a quantity of gases sufficient to utilize the Bernoulli principle for supporting a sheet of glass so that the sheet will not come into injurious contact with the concave surface, and a second mode of operation to increase the pressure of the gases above the concave surface so that the sheet may be floated at a higher distance above the concave surface to enable it to float radially outwardly and over the ramp 74. The second mode of operation may be accomplished by opening the door 64 to allow a higher quantity of gases to flow into the plenum chamber or the outlet passages 48 may be plugged to increase the pressure of the gases above the concave surface.

A third method in which a sheet of glass may be prevented from coming into injurious contact with the mold is by controlling the rate of heating of the sheet of glass. The sheet of glass, as it is suspended across the concave surface of a mold 36 during the first portion of a revolution of the floor 16, is heated. No gases are supplied through the inlet passages 46 while the sheet is being heated and softened so that it will sag to conform to the surface of the mold 36. The heating of the glass may be regulated so that the sheet of glass has sagged a predetermined degree as the mold is approaching the outlet aperture 72. A sensing means is employed in the center of the concave surface, such as the minute microswitch 92, shown in FIG. 3, to contact the center of the sheet of glass to control the means for moving the gases so that the gases will be supplied to the inlet passages 46. For example, the microswitch 92 may activate the motor 65 connected to the door 64 associated with that particular mold to open the door to allow gases to flow through the inlet passages 46 of that particular mold. The sheet of glass will then be supported relatively high off the concave surface and will float radially outwardly over the ramps 74 when the respective mold is aligned with the ramp 74 and the plunger 68 is retracted.

It is to be noted in regard to all of the above methods that although a sheet of glass is suspended across a concave surface by resting two or more opposed edges of the sheet on the mold, eventually the edges of the sheet of glass will be floated on gases above the surface since as the sheet sags the gases supplied beneath the sheet may be forced outwardly to raise the edges off the mold. As pointed out hereinbefore, the placing of a sheet of glass on a convex mold does not prevent the sheet from coming into injurious contact with the mold since the gases may never force the center portion of the sheet off the mold so as to prevent marring contact with the mold when the sheet softens.

Regardless of which of the above methods is utilized in the furnace, an alternative mode of operation for removing a floating sheet of glass from a mold may be utilized. Instead of relying entirely on a component of force due to gravity and caused by the slant of the mold to move a sheet of glass over one extremity of the mold, a supplemental or alternative mechanical means may be provided to move a floating sheet of glass from the mold. For example, as illustrated in FIG. 1, a rod 92 may be inserted through a hole or aperture 94 in the housing 12 so that a pad 96 attached thereto engages one edge of a sheet of glass floating above the mold. As the rod 92 is withdrawn from the housing 12, the pad 96 pushes a floating sheet of glass over the outward extremity of the mold and over the ramp 74 and into the blasthead 76. The rod 92 may be manually withdrawn from the housing 12 or a motor, hydraulic or pneumatic cylinder, or the like, may be provided to withdraw the rod 92 from the housing at the proper time. It will be apparent to those skilled in the art that many variations and embodiments of other mechanical means may be utilized to move a floating sheet of glass from a mold to the ramp 74 and blasthead 76. Furthermore, such a mechanical means may be utilized in conjunction with a slanted mold so that a combination of a component of force due to gravity and the mechanical means moves a floating sheet of glass from the mold to the ramp 74 and blasthead 76. The mechanical means may also be utilized with a mold which has no slant to create a component of force due to gravity acting on a sheet of glass. That is to say, the mold may be horizontal, so that a sheet of glass will not float over one extremity of the mold due to a component of force caused by the weight of the sheet of glass, and a mechanical means may be employed with the mold as the only means of moving a floating sheet of glass over one extremity of the mold and over the ramp 74 and into the blasthead 76.

Although the invention has been described and illustrated by setting forth a furnace utilizing a plurality of molds, it is pointed out that the invention may be practiced by utilizing one or more stationary molds upon which sheets of glass are serially treated one after the other. For example, a plurality of molds may be disposed next to one another in a row so that a sheet of glass may be placed on each mold for treating. A blasthead could then be moved from one mold to another to receive a sheet of heated glass from each respective mold. That is to say, instead of placing the molds on a moving platform, the molds may be stationary and the blasthead moved from mold to mold to receive sheets of glass.

As alluded to hereinbefore, the present invention is very satisfactory for making compoundly curved or spherically curved sheets of glass; however, the methods set forth in this invention are also particularly well suited for treating flat sheets of glass as well. For example, a cold sheet of flat glass may be placed above a flat surface and the sheet may be supported above the flat surface by gases so as to prevent the sheet from coming into injurious contact with the surface while the sheet is being heated to a temperature sufficient for tempering. The sheet may be supported on a film of gases sufficient to support less than the entire weight of the sheet of glass while being heated, or the surface may have inlets and outlets so that the sheet of flat glass is supported on gases flowing from the inlets to the outlets. In either method of preventing a flat sheet of glass from contacting the flat surface, the sheet may be floated on gases at a greater distance from the surface when the sheet has reached a temperature sufficient for tempering, or when the sheet is supported by gases flowing in accordance with the Bernoulli principle, the sheet may be floated over the surface without floating it at a greater height above the bed or mold surface. Also, as alluded to previously, the flat surface could be slanted so that the sheet of glass floats away from the flat surface under the force of gravity, or the floating sheet of flat glass may be moved away from the flat surface by mechanical means once the sheet has reached a temperature sufficient for tempering and is being floated at a sufficient distance above the surface to allow the sheet to be floated away from the surface. By supporting a flat sheet of glass on gases above a flat surface to heat the sheet of glass for tempering, the sheet may be heated without injury being caused to the softened sheet by tongs, or the like which are customarily used to suspend a sheet of glass within a furnace.

Furthermore, while the invention has been described above in its particulars chiefly with reference to the reshaping of a glass sheet from flat to curved contour, it should be understood that the invention finds utility and in fact, is highly advantageous for other types of treatment to glass sheets, thermoplastic sheets, or other kinds of sheet material. As set forth hereinbefore, the method and apparatus is excellent for tempering or otherwise heat treating flat glass sheets. For this embodiment, the bed surface for the heating of the glass sheet, instead of being concave or convex for the reshaping of the glass, is flat and the bed surface for the cooling operation in the blasthead is likewise flat. Of course, the invention is also useful for cutting or fusing to a glass sheet ceramic paints or other coloring materials, or oxides, or the like, or for imparting special electrical or other characteristics thereto. The system is also ideal for heating glass sheets of the nucleating type. Utilizing the embodiment incorporating the Bernoulli principle, for example, the excellent support for the glass afforded by the method can be used to advantage to prevent a change in shape of the glass as the nuclei are formed. Further, it should be understood that it is not essential for the path of sheet movement on to and off the bed or mold define a straight line. For example, in the embodiment incorporating the Bernoulli principle for supporting the glass sheet, the bed or mold wherein the glass sheet is heated can be spherically concave and the bed within the blasthead along with the bed leading to the blasthead can be a continuation of such a spherical surface such that spherical shaped glass sheets can be first formed on one portion of the surface then moved across th surface to be tempered.

We claim:

1. An apparatus for curving a sheet of glass comprising: a mold having a concave surface and supported within said apparatus, said mold including means for supporting and suspending a generally flat sheet across said concave surface and for preventing the sheet from moving laterally over said surface, heating means for heating a sheet supported on said mold, means supplying gases above said concave surface for at least supporting the major portion of the weight of the sheet to prevent the sheet from coming into injurious contact with said concave surface as the sheet is heated and sags to conform to said concave surface, said means supplying gases supplies gases sufficient to support the entire weight per unit area of the sheet, and sensing means for detecting when a sheet has sagged to a predetermined distance above the central portion of said concave surface to control said means supplying gases for providing said gases to float the sheet above said concave surface at a second distance which is greater than said predetermined distance.

2. An apparatus for curving a sheet of glass comprising: a mold having a concave surface and supported within said apparatus, said mold including means for supporting and suspending a generally flat sheet across said concave surface and for preventing the sheet from moving laterally over said surface, heating means for heating a sheet supported on said mold, means supplying gases above said concave surface for at least supporting the major portion of the weight of the sheet to prevent the sheet from coming into injurious contact with said concave surface as the sheet is heated and sags to conform to said concave surface, a housing having a floor, a plurality of said molds disposed generally in a circle on said floor, cooling means disposed adjacent said housing to receive sheets from the respective molds for cooling the sheets, means for effecting relative rotation between said cooling means and said floor so that said cooling means is sequentially aligned with said molds to receive sheets therefrom, and means for moving sheets from each mold to said cooling means, said means for moving sheets including a support for supporting said molds on said floor at an angle with a horizontal plane so that each mold slants downward in a radially outward direction from the center of the circle of molds so that a sheet supported on gases over each mold has a component of force due to the weight thereof which urges each sheet to move radially outward and over the radially outward extremity of each mold.

3. An apparatus for treating a sheet of glass comprising: a housing, a bed having a glass support surface and disposed within said housing, said bed being slanted in said housing at an angle with a horizontal plane, heating means disposed in said housing, blower means for supplying hot gases over said support surface for supporting a sheet of glass thereover, control means for controlling the supply of gases to said support surface, said control means having a first mode of operation for supplying sufficient gases for at least supporting the major portion of the weight of the sheet to prevent the sheet from coming into injurious contact with said surface, said control means having a second mode of operation for supplying gases to support the sheet at a distance above said surface to allow the sheet to move over said surface under the force of gravity in the direction in which said mold is slanted and stop means disposed adjacent the lowest extremity of said surface for selectively preventing the sheet from moving under the force of gravity while supported above said surface by said gases, said stop means being operable to allow the sheet to float over and away from said surface during said second mode of operation of said control means.

4. An apparatus as set forth in claim 3 wherein said support surface of said bed is concave.

5. A method of curving a sheet of material such as glass comprising the steps of: suspending a sheet across a concave surface, preventing the sheet from moving laterally over the concave surface, heating the sheet sufficiently so that said sheet softens and sags under the force of gravity, and supplying gases over the concave surface to at least support a major portion of the weight of the sheet for preventing the sheet from moving into injurious contact with the concave surface as the sheet sags to a predetermined curvature in conformance with the concave surface.

6. An apparatus as set forth in claim 1 wherein said concave surface is disposed at an angle with a horizontal plane so that a sheet supported on said gases has a component of force due to the weight thereof which urges the sheet toward one extremity of said concave surface.

7. An apparatus as set forth in claim 6 including means adjacent one extremity of said concave surface to selectively engage a sheet to selectively prevent a sheet from floating toward and over said extremity.

8. An apparatus as set forth in claim 2 including stop means disposed adjacent the radially outward extremity of each mold for preventing a sheet which is floating on gases above a mold from floating radially outward from the center of the circle of molds, said stop means being selectively operable to allow a sheet to float radially away from the center of the circle of molds.

9. An apparatus as set forth in claim 8 including a ramp for being positioned adjacent the radially outward extremities of said molds, said ramp being disposed to slant downward in a direction radially away from the center of the circle of molds, means to provide gases over said surface of said ramp for floating a sheet of glass thereover.

10. A method as set forth in claim 5 wherein the step of supplying gases consists of the steps of supplying gases over the concave surface to prevent the sheet from injuriously contacting the concave surface and thereafter increasing the degree gas flow over the concave surface to support the sheet at an increased distance above the concave surface that the sheet reaches said predetermined curvature.

11. A method as set forth in claim 10 including orienting the sheet at an angle with a horizontal plane while supported on gases so that a component of force due to the weight of the sheet will urge the sheet to float over an extremity of the mold to an adjacent station when the sheet is at said increased distance.

12. A method as set forth in claim 5 further defined as supplying a sufficient flow of said gases to support the sheet on said gases at a sufficiently increased distance above said surface after the sheet reaches said predetermined curvature so that the sheet may then be moved laterally over one extremity of the mold.

13. A method as set forth in claim 12 including orienting the sheet at an angle with a horizontal plane while supported on gases so that a component of force due to the weight of the sheet will urge the sheet to float toward and over the one extremity of the mold to an adjacent station.

14. A method of curving a sheet of material such as glass comprising the steps of: suspending a sheet across a concave surface, preventing the sheet from moving laterally over the concave surface, heating the sheet sufficiently so that said sheet softens and sags under the force of gravity, supplying gases over the concave surface to support less than the entire weight per unit area of the sheet above the concave surface, increasing the degree of gas flow over the concave surface to support the sheet on gases at an increased distance above the surface after the sheet reaches said predetermined curvature so that the sheet may be moved laterally toward and over one extremity of the mold.

15. A method as set forth in claim 14 including orienting the sheet at an angle with a horizontal plane while supported on gases so that a component of force due to the weight of the sheet will urge the sheet to float over the extremity of the mold when the sheet is at said increased distance.

16. A method of curving a sheet of material such as glass comprising the steps of: suspending a sheet across a concave surface, preventing the sheet from moving laterally over the concave surface, heating the sheet sufficiently so that said sheet softens and sags under the force of gravity, supplying gases over the concave surface in a manner to increase the velocity thereof across the concave surface to hold the sheet at a predetermined distance above the concave surface as the sheet sags to conform to the concave surface while preventing the sheet from moving into injurious contact with the concave surface, and increasing the degree of gas flow to support the sheet on gases at an increased distance above said surface after the sheet reaches said predetermined curvature so that the sheet may be then moved laterally over one extremity of the mold.

17. A method as set forth in claim 16 orienting the sheet at an angle with a horizontal plane while supported on gases so that a component of force due to the weight of the sheet will urge the sheet to float over the extremity of the mold when the sheet is at said increased distance.

18. A method of curving a sheet of material such as glass comprising the steps of: suspending a sheet across a concave surface, preventing the sheet from moving laterally over the concave surface, heating the sheet sufficiently so that the sheet softens and sags under the force of gravity, allowing the sheet to sag under the force of gravity until the sheet has reached a predetermined curvature and is a predetermined distance above the central portion of the concave surface, and supplying sufficient gases over the concave surface when the sheet is at said predetermined distance for supporting the sheet at an increased distance above the concave surface so that the sheet may then be moved laterally over one extremity of the mold and whereby the sheet is prevented from moving into injurious contact with the concave surface.

19. A method as set forth in claim 18 orienting the sheet at an angle with a horizontal plane while supported on gases so that a component of force due to the weight of the sheet will urge the sheet to float over the extremity of the mold when the sheet is at said increased distance.

References Cited

UNITED STATES PATENTS

| | | | |
|---|---|---|---|
| 787,438 | 4/1905 | Cutler | 65—287 |
| 1,489,729 | 4/1924 | Aucremanne | 65—273 |
| 2,123,552 | 7/1938 | Helwig | 65—287 X |
| 2,505,103 | 4/1950 | Devol | 65—25 |
| 3,223,501 | 12/1965 | Fredley et al. | 65—25 |

ARTHUR D. KELLOGG, Primary Examiner

U.S. Cl. X.R.

65—107, 182, 285, 287, 361